May 13, 1930.　　　R. L. SMITH　　　1,758,266
HEAT EXCHANGE APPARATUS
Filed April 13, 1927
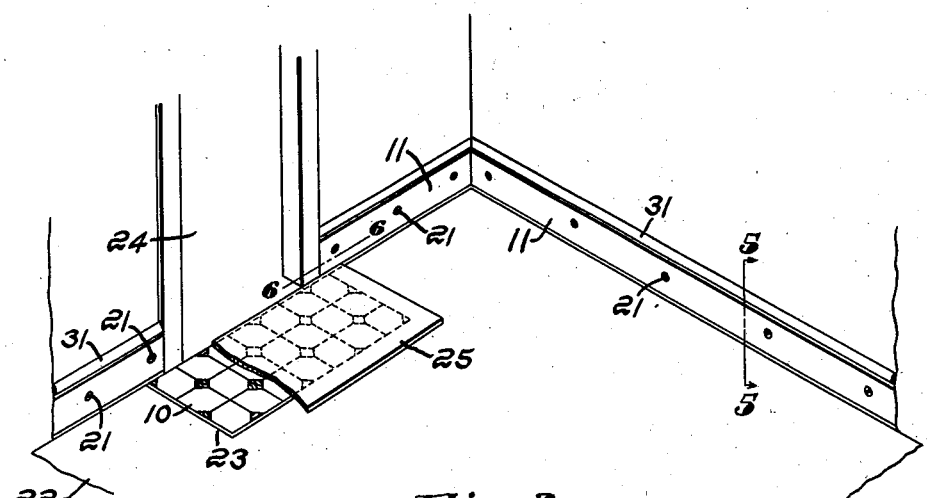
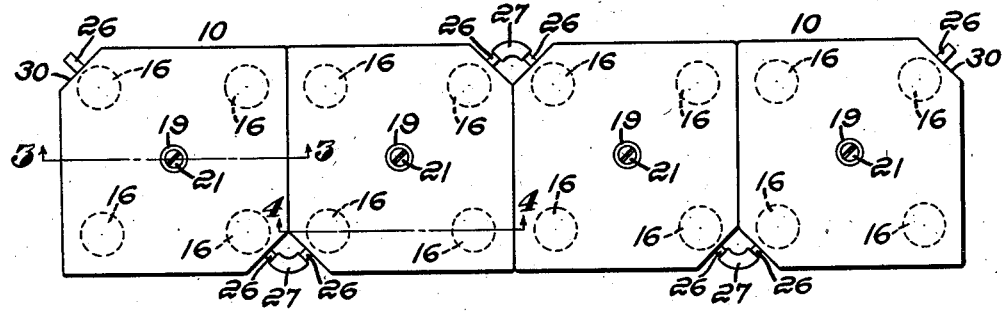
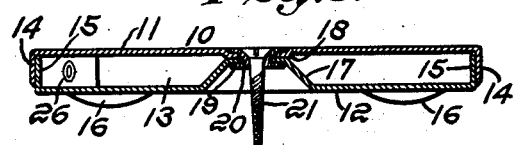
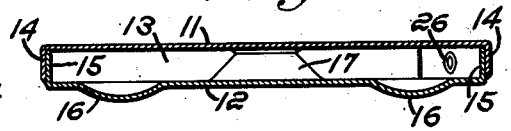
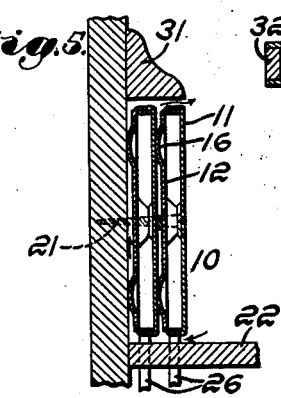
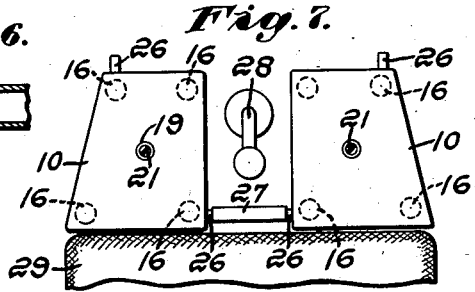
Inventor:
Roland L. Smith,
by Emery, Booth, Janney & Varney,
Attys.

Patented May 13, 1930

1,758,266

UNITED STATES PATENT OFFICE

ROLAND L. SMITH, OF BELMONT, MASSACHUSETTS

HEAT-EXCHANGE APPARATUS

Application filed April 13, 1927. Serial No. 183,404.

This invention relates to heat exchange apparatus, and will be best understood by reference to the following description, when taken in connection with the accompanying drawings of one specific embodiment thereof, while its scope will be more particularly pointed out in the appended claims.

In the drawings:

Fig. 1 is a perspective view of heat exchange apparatus exemplifying the invention, as used for heating the interior of a building;

Fig. 2 is a plan, on an enlarged scale, of a portion of the heat exchange apparatus shown in Fig. 1;

Fig. 3 is a sectional view, on an enlarged scale, on line 3—3 of Fig. 2;

Fig. 4 is a sectional view, on an enlarged scale, on line 4—4 of Fig. 2;

Fig. 5 is a sectional view, on an enlarged scale, on line 5—5 of Fig. 1;

Fig. 6 is a sectional view, on an enlarged scale, on line 6—6 of Fig. 1; and

Fig. 7 is a plan of heat exchange apparatus exemplifying the invention, as used for heating the interior of a vehicle, such as a motor car.

Referring to the drawings, and to the embodiment of the invention which is selected for exemplification, and having reference at first to Fig. 3, the heat exchange apparatus comprises a receptacle 10, including two spaced sheet metal plates 11 and 12, whose edges are suitably secured together, thereby presenting a chamber 13. Herein, the plates are conveniently secured together at their edges by providing the plate 11 with marginal flanges 14, and the plate 12 with similar marginal flanges 15, the flanges of each plate being directed toward the other plate, and overlapping the flanges of the other plate. The flanges of one plate are secured to those of the other plate, as by soldering or welding them together to make a water-tight joint.

One of the plates, herein the plate 12, is extruded at several points, to provide a plurality of hollow, outwardly directed projections 16, best shown in Fig. 4, to space such plate from any support against which the receptacle is placed, thereby to provide for the circulation of air between said receptacle and said support, thus to obtain the benefit of the entire area of the receptacle. To space the plates from each other, one of them, herein the plate 12, is extruded to provide a projection 17, which is directed toward the other plate, and is suitably joined thereto, as by welding the two plates together at 18. In the present example, the plates are further secured to each other at this point by an eyelet 19, which extends through an opening 20 presented by both plates, said eyelet being headed over on both sides. This eyelet, likewise, in this instance, is welded in place. In some cases, the eyelet may be dispensed with, and in other cases, where the eyelet is employed, the precaution of welding may be dispensed with. In either case, the opening provided at this point receives a fastening element, herein a screw 21 for attachment to the support against which the receptacle is placed.

The receptacle may take various forms, and may be variously placed, either horizontally or vertically. As shown in Fig. 2, and in a part of Fig. 1, the receptacles are tile-like bodies, being generally rectangular in form, and placed edge to edge in a horizontal position. In Fig. 1, the room therein shown has a floor 22, presenting a depression 23, adjacent a doorway 24, and in this depression several of the units are placed edge to edge, and they are covered by an appropriate covering, such as a mat or rug 25, which conceals and protects them from injury. When thus placed, the heating units warm the air in the room, by heat transmitted through the rug. Any cold air entering through the open door or beneath the closed door is thus heated. Of course, the same would apply to a window.

Each heating unit is provided with two pipes 26, communicating with the chamber 13, one pipe serving as an inlet and the other as an outlet. These pipes project laterally from the unit,—that is to say, from its edges, thus making it possible to connect them to one another most conveniently, as well as to connect them to the source of supply of the water, or steam, which is to be used. The most convenient location for these pipes is at diagonally opposite corners, as this location facilitates connecting units in series, as shown for example in Fig. 2, without the need of making units differing from each other in location of their pipes. As shown in Fig. 2, the inlet pipe of one unit is connected to the outlet pipe of the next adjacent unit by a suitable conduit, such as a rubber tube 27, when the pipes 26 are oblique to the principal edges of the unit, as shown in Fig. 2, these tubes are conveniently made as elbows. In other situations, such as that shown in Fig. 7, which is an installation on the floor of a motor car, the pipes 26 are not oblique, and the connecting tube 27 is straight. In this situation, the units are of suitable size and shape to be fitted in place on the floor, and may be placed, for example, on either side of a gear-shifting lever 28, and in front of a seat 29. Thus it is possible to use a pair of the units of a certain size and shape for cars of several different makes and sizes, by simply placing the units a greater or less distance apart, and by making the connecting tube the proper length.

Referring again to Fig. 2, the two diagonally opposite corners to which the pipes are secured are truncated, as at 30, thus making it possible to provide the connections between the units, and still place adjacent edges of two units close to or against each other. When there are several rows of units, as in Fig. 1, these truncated corners provide openings between the units for the circulation of air through the openings and beneath the units.

As already stated, in some cases, it is desirable to place the units vertically. One example of this is shown in Figs. 1 and 5, and in this case, the units, while being generally rectangular in form, are elongated. Here, the units are placed about the sides of the room, in place of the usual baseboard, and beneath a usual moulding 31. There are inconspicuous, and if desired, may be given a finish to match that of the woodwork in the room, thereby harmonizing so completely with the finish that their presence will scarcely be noted. In this case, as shown in Fig. 5, the units are so placed that there is an opportunity for the circulation of air beneath, behind, and above them, as indicated by arrows. In most cases, a single tier of the heat units will suffice, particularly when the connections to the source of supply can conveniently be made. In other cases, particularly where the connections to the source of supply can be made more conveniently, two of the heating units are placed face to face, in which case the projections 16 on one rest against the face of the other unit, and space them apart, thus providing for the circulation of air between them. In the case of these elongated units, they may, if desired, be supplied to builders in indefinite lengths, open at their ends, and later cut to fit the spaces which they are to occupy. In such cases, as shown in Fig. 6, there is provided a filler 32 at each end of the unit, which of course will be secured in place as by welding or soldering.

Among the many advantages of the described heat exhange apparatus, it may be mentioned that it is extremely inconspicuous, and is a multiple unit arrangement, which can be built up of sections to meet the requirements of the situation, and, what is equally important, the usable space in the room or other place where the apparatus is used is greater than with other forms of heat exchange apparatus.

Having thus described one embodiment of my invention, but without limiting myself thereto, what I claim and desire by Letters Patent to secure is:

1. In heat exchange apparatus, the combination of a plurality of generally flat, rectangular, hollow units disposed edge to edge, each unit having two oblique corners, one presenting an inlet and the other an outlet, the inlet of one unit being adjacent the outlet of the next adjacent unit, and a conduit connecting said inlet with said outlet and disposed between adjacent edges of the connected units.

2. In heat exchange apparatus, the combination of a plurality of generally flat, rectangular, hollow units disposed edge to edge, each unit having two diagonally opposite oblique corners, one presenting an inlet and the other an outlet, the inlet of one unit being adjacent the outlet of the next adjacent unit, and a conduit connecting said inlet with said outlet.

3. In heat exchange apparatus, the combination of a receptacle comprising two spaced sheet metal plates whose edges are secured together, said plates thereby presenting a chamber between said plates, one of said plates having a substantially flat face and the other being extruded to provide a hollow, outwardly directed projection which is adapted to rest against a support for said receptacle, and by which projection said receptacle is spaced from said support to provide for the circulation of air between said receptacle and said support.

4. In heat exchange apparatus for use in a recess presented by a support, the combination of a generally flat, hollow body adapted to be placed within said recess and secured to said support, said body having means for supporting the same on and spacing the same from said support to provide for circulation of air into said recess, between said body and said support, and out of said recess.

5. In heat exchange apparatus, the combination of a plurality of generally flat, rectangular, hollow units disposed edge to edge, each unit having two truncated corners, one presenting an inlet and the other an outlet, the inlet of one unit being adjacent the outlet of the next adjacent unit, and a conduit connecting said inlet with said outlet.

6. In heat exchange apparatus, the combination of a plurality of generally flat, rectangular, hollow units disposed edge to edge, each unit having two diagonally opposite, truncated corners, inlet and outlet pipes communicating with the interior of said unit and projecting from said truncated corners, respectively, obliquely with reference to said edges, and a conduit connecting the inlet pipe of one unit with the outlet pipe of the next adjacent unit.

7. In heat exchange apparatus, the combination of a thin, flat, generally rectangular, hollow heating unit, and inlet and outlet pipes projecting from the edges of said unit adjacent diagonally opposite corners and oblique to the sides of the rectangle.

8. In heat exchange apparatus, the combination of a series of hollow, tile-like heating units adapted to be superimposed upon a floor and having means to space them from the floor to provide for the circulation of air beneath them, said units communicating with one another, and a covering superimposed upon said heating units to transmit heat therefrom to the space above said covering.

9. In heat exchange apparatus, the combination of a series of hollow, tile-like heating units adapted to be superimposed upon a floor and spaced therefrom and presenting spaces leading from the under side to the upper side thereof to provide for the circulation of air from the upper side to the under side of said units, and a covering superimposed upon said heating units to transmit heat therefrom to the space above said covering.

In testimony whereof, I have signed my name to this specification.

ROLAND L. SMITH.